(12) United States Patent
Kobayashi (10) Patent No.: US 8,233,192 B2
(45) Date of Patent: Jul. 31, 2012

(54) CONTROL CIRCUIT OF IMAGE READER, IMAGE READER, CONTROL METHOD OF IMAGE READER, AND PROGRAM

(75) Inventor: Kenji Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 682 days.

(21) Appl. No.: 12/383,414

(22) Filed: Mar. 24, 2009

(65) Prior Publication Data

US 2009/0237688 A1 Sep. 24, 2009

(30) Foreign Application Priority Data

Mar. 24, 2008 (JP) ................................ 2008-075317
Dec. 26, 2008 (JP) ................................ 2008-332956

(51) Int. Cl.
*H04N 1/40* (2006.01)
(52) U.S. Cl. ........................................ 358/2.1; 358/461
(58) Field of Classification Search .................. 358/1.9, 358/2.1, 529–530, 461, 509, 474–475, 448
See application file for complete search history.

(56) References Cited

U.S. PATENT DOCUMENTS 5,251,024 A * 10/1993 Furukawa et al. ............. 358/527
7,050,204 B1 * 5/2006 Sato et al. ...................... 358/471

FOREIGN PATENT DOCUMENTS

JP 2002-237929 8/2002

* cited by examiner

*Primary Examiner* — Thomas D Lee
*Assistant Examiner* — Stephen M Brinich
(74) *Attorney, Agent, or Firm* — Nutter McClennen & Fish LLP; John J. Penny, Jr.; Michael P. Visconti, III (57) ABSTRACT

A control circuit of an image reader having at least one light source includes: a light source control portion that controls ON and OFF of the light source by performing current switching for adjusting a value of a current supplied to the light source; a black reference data creating portion that creates black reference data used for shading correction under control of the light source control portion; an image reading portion that reads image data under control of the light source control portion; and a shading correction portion that performs shading correction of the image data using the black reference data. The black reference data creating portion adds a noise, which is equivalent to a noise added to the image data by the current switching, to the black reference data, and the shading correction portion removes the noise added to the image data by performing the shading correction.

6 Claims, 7 Drawing Sheets

1 LINE READ (MAIN SCANNING)

STATE 1
Red SWITCH 114R → OFF
Green SWITCH 114G → OFF
Blue SWITCH 114B → OFF
DUMMY CIRCUIT → ON

STATE 2
Red SWITCH 114R → ON
Green SWITCH 114G → OFF
Blue SWITCH 114B → OFF
DUMMY CIRCUIT → OFF

STATE 3
Red SWITCH 114R → OFF
Green SWITCH 114G → OFF
Blue SWITCH 114B → OFF
DUMMY CIRCUIT → ON

STATE 4
Red SWITCH 114R → OFF
Green SWITCH 114G → ON
Blue SWITCH 114B → OFF
DUMMY CIRCUIT → OFF

STATE 5
Red SWITCH 114R → OFF
Green SWITCH 114G → OFF
Blue SWITCH 114B → OFF
DUMMY CIRCUIT → ON

STATE 6
Red SWITCH 114R → OFF
Green SWITCH 114G → OFF
Blue SWITCH 114B → ON
DUMMY CIRCUIT → OFF

CONTROL CIRCUIT OF IMAGE READER, IMAGE READER, CONTROL METHOD OF IMAGE READER, AND PROGRAM

The entire disclosure of Japanese Patent Application Nos: 2008-075317, filed Mar. 24, 2008 and 2008-332956, filed Dec. 26, 2008 are expressly incorporated by reference herein.

BACKGROUND

1. Technical Field

The present invention relates to a control circuit of an image reader, an image reader, a control method of an image reader, and a program.

2. Related Art

In general, an image reader sequentially turns on a plurality of light sources (for example, a red LED, a green LED, and a blue LED) provided in a carriage when reading a monochrome image. In this case, a value of a current supplied to a light source to be turned on may be adjusted by supplying a current to a dummy circuit before supplying the current to the light source.

For example, JP-A-2002-237929 discloses a technique in which LEDs are turned on with the same duty ratio as in reading a color document when reading a monochrome document and currents supplied to the LEDs are made equal by setting the lighting time of each LED to ⅓ at the time of both reading of a monochrome document and reading of a color document. If the technique disclosed in JP-A-2002-237929 is used, a value of a current supplied to each LED provided in a carriage may be adjusted by supplying a current to a dummy circuit as described above.

However, in the case where a light source control circuit is built in an AFE (analog front end) that converts a read image into digital data and outputs the digital data, a noise is added to the digital data output from the AFE by switching of supply of a current to each light source or a dummy circuit.

SUMMARY

An advantage of some aspects of the invention is that it provides a technique of reducing a noise which is added to image data by switching of supply of a current to each light source or a dummy circuit.

According to an aspect of the invention, a control circuit of an image reader having at least one light source includes: a light source control portion that controls ON and OFF of the light source by performing current switching for adjusting a value of a current supplied to the light source; a black reference data creating portion that creates black reference data used for shading correction under control of the light source control portion; an image reading portion that reads image data under control of the light source control portion; and a shading correction portion that performs shading correction of the image data using the black reference data. The black reference data creating portion adds a noise, which is equivalent to a noise added to the image data by the current switching, to the black reference data, and the shading correction portion removes the noise added to the image data by performing the shading correction.

With the control circuit according to the aspect of the invention, the noise that is added to the image data by switching of supply of the current to the light source or the dummy circuit can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

Figure 1:
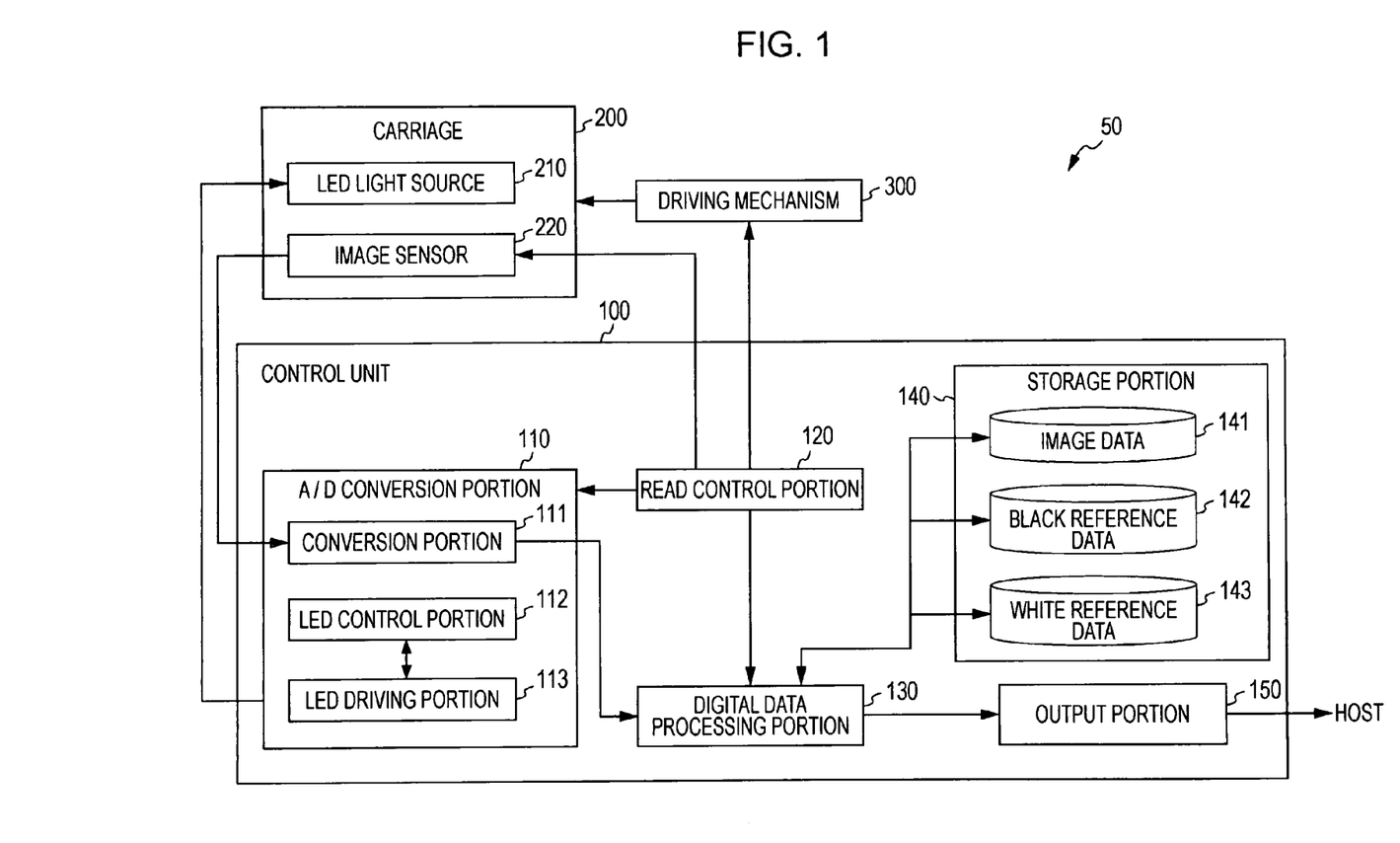
FIG. 1 is a view illustrating the schematic configuration of an image reader according to an embodiment of the invention.

FIG. 1 is a view illustrating the schematic configuration of an image reader 50 to which an embodiment of the invention is applied.

The image reader 50 is a so-called flatbed type image reader in which a document stand (not shown) is provided on an upper surface of a housing. The image reader 50 reads an image of a document placed on the document stand, which is a transparent plate, by scanning using an image sensor 220.

As shown in FIG. 1, the image reader 50 includes: a carriage 200 mounted with an LED light source 210 and the image sensor 220; a driving mechanism 300 which controls the movement of the carriage 200; and a control unit 100 which makes an overall control of the image reader 50 and performs various processing for reading an image.

The carriage 200 carries the LED light source 210 and the image sensor 220 in a sub-scanning direction. The carriage 200 is slidably locked on a guide shaft, which is parallel to a board surface of the document stand, and is moved by a belt which rotates by a motor of the driving mechanism 300. The movement amount of the carriage 200 is controlled by an output value of an encoder that outputs a pulse according to the rotation amount of the motor of the driving mechanism 300.

In addition, the carriage 200 has a mechanism for creating white reference data used to perform general shading correction. For example, the carriage 200 includes a silver reflecting plate, a semiconductor, and the like as the mechanism for creating the white reference data. In addition, black reference data is also used for the general shading correction, but the carriage 200 does not include a special mechanism for creating the black reference data. In case of creating the black reference data, the carriage 200 creates the black reference data by reading image data in a state where the LED light source 210 is turned off, for example.

The LED light source 210 is configured to include a red LED, a green LED, and a blue LED and generates light components of three colors of RGB in order.

The image sensor 220 receives light reflected from a document, accumulates electric charges corresponding to the amount of the received light, and transmits the electric charges to the control unit 100 as an image read signal (analog data).

The image sensor 220 is formed of a plurality of sensor chips arrayed in a main scanning direction. Each sensor chip has the same construction as a normal CCD (charge coupled device) image sensor. In addition, the image sensor 220 may be a two-dimensional image sensor. In addition, the image sensor 220 may also be a CMOS image sensor and the like.

The control unit 100 includes: an A/D conversion portion 110 that converts analog data output from the image sensor 220 into digital data; a digital data processing portion 130 that performs various kinds of correction on the digital data output from the A/D conversion portion 110; a storage portion 140 that stores digital data on which the digital data processing portion 130 performs various kinds of correction; an output portion 150 that transmits data from the digital data processing portion 130 to a host, such as a personal computer; and a read control portion 120 that makes an overall control of functional portions in the control unit 100 and controls the driving mechanism 300.

The A/D conversion portion 110 is formed of an analog front-end IC (integrated circuit), for example, and has a conversion portion 111 that converts analog data (read data) output from the image sensor 220 into digital data. In addition, the digital data converted by the conversion portion 111 is output to the digital data processing portion 130, which will be described later.

Furthermore, the A/D conversion portion 110 has an LED driving portion 113 that turns on and off the LED light source 210 in the carriage 200 and adjusts a value of a current supplied to the LED light source 210. In addition, the A/D conversion portion 110 has an LED control portion 112 that transmits to the LED driving portion 113 an instruction of control of the LED light source 210.

Figure 2:
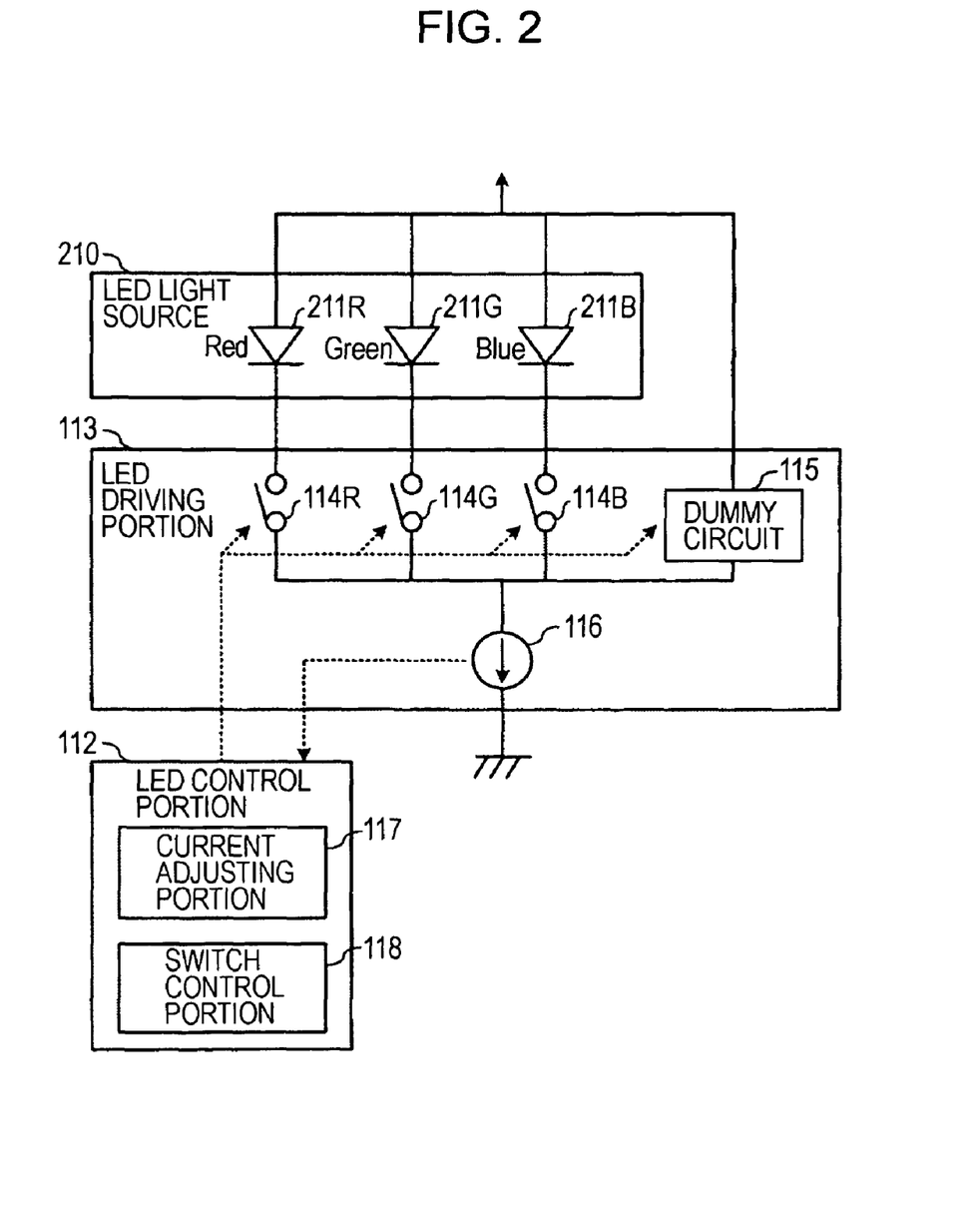
FIG. 2 is a view illustrating the detailed configuration of an LED control portion, an LED driving portion, and an LED light source.

FIG. 2 is a view illustrating the detailed configuration of the LED control portion 112, the LED driving portion 113, and the LED light source 210.

As shown in FIG. 2, the LED driving portion 113 includes exclusive switches (switch 114R only for red LED, switch 114G only for green LED, and switch 114B only for blue LED) that determine whether to allow a current to flow to LEDs (red LED 211R, green LED 211G, and blue LED 211B) (determine ON and OFF of LEDs). The switch 114R only for red LED is connected in series to the red LED 211R between a power source and ground. Similarly, the switch 114G only for green LED is connected in series to the green LED 211G between the power source and the ground, and the switch 114B only for blue LED is connected in series to the blue LED 211B between the power source and the ground.

In addition, the LED driving portion 113 includes a dummy circuit 115 used to adjust a values of a current supplied to each of the LEDs 211R, 211G, and 211B. The dummy circuit 115 is connected in parallel with each of the LEDs 211R, 211G, and 211B between the power source and the ground. The dummy circuit 115 is formed by a circuit group having a resistance circuit and a switch, for example.

In addition, the LED driving portion 113 includes a galvanometer 116. The galvanometer 116 is connected in series to each of the red LED 211R, the green LED 211G, the blue LED 211B, and the dummy circuit 115.

The LED control portion 112 is formed by a current DAC (digital to analog converter), for example, and controls the LED driving portion 113 to perform switching of the unit (red LED 211R, green LED 211G, blue LED 211B, dummy circuit 115) to which a current is supplied. Specifically, the LED control portion 112 supplies to the LED driving portion 113 a control signal (dotted line) for switching of each of the switches 114R, 114G, 114B, and 115 in the LED driving portion 113 and a control signal (dotted line) for acquiring a value of a current flowing through the galvanometer 116 in response to an instruction signal supplied from the read control portion 120 to be described later.

Such an LED control portion 112 has a current adjusting portion 117 and a switch control portion 118, as shown in FIG. 2.

The current adjusting portion 117 adjusts a value of a current supplied to each of the LEDs 211R, 211G, and 211B. Specifically, the current adjusting portion 117 supplies a current to the dummy circuit 115 and adjusts a value of a current supplied to the dummy circuit 115 on the basis of an output value from the galvanometer 116 before a current is supplied to each of the LEDs 211R, 211G, and 211B. In this case, for example, the current adjusting portion 117 makes an adjustment such that the value of the current supplied to the dummy circuit 115 matches a current value (digital data) stored beforehand in an exclusive register (not shown). Alternatively, the current adjusting portion 117 adjusts the value of the current supplied to the dummy circuit 115 by continuously supplying the current to the dummy circuit 115 during a mask period (period until the value of the current supplied to the dummy circuit 115 becomes equal to a predetermined value) stored beforehand in an exclusive register (not shown).

Here, the main reason why the current adjusting portion 117 supplies a current to the dummy circuit 115 before supplying a current to each of the LEDs 211R, 211G, and 211B is to supply a stable current to each of the LEDs 211R, 211G, and 211B.

In addition, another reason is to suppress the power (current) fluctuation by alternately supplying the power to each of the LEDs 211R, 211G, and 211B and the dummy circuit 115 and to reduce an adverse effect caused by the fluctuation in power to an analog circuit, such as an A/D conversion circuit.

The switch control portion 118 controls ON and OFF of each of the switches 114R, 114G, and 114B and a switch of the dummy circuit 115 in the LED driving portion 113 by supplying a control signal thereto. By switching ON and OFF of each of the switches 114 and 115 by means of the switch control portion 118 after the current adjusting portion 117 adjusts the value of the current supplied to the dummy circuit 115, a current with a current value after the adjustment can be supplied to each of the LEDs 211R, 211G, and 211B.

Figure 3:
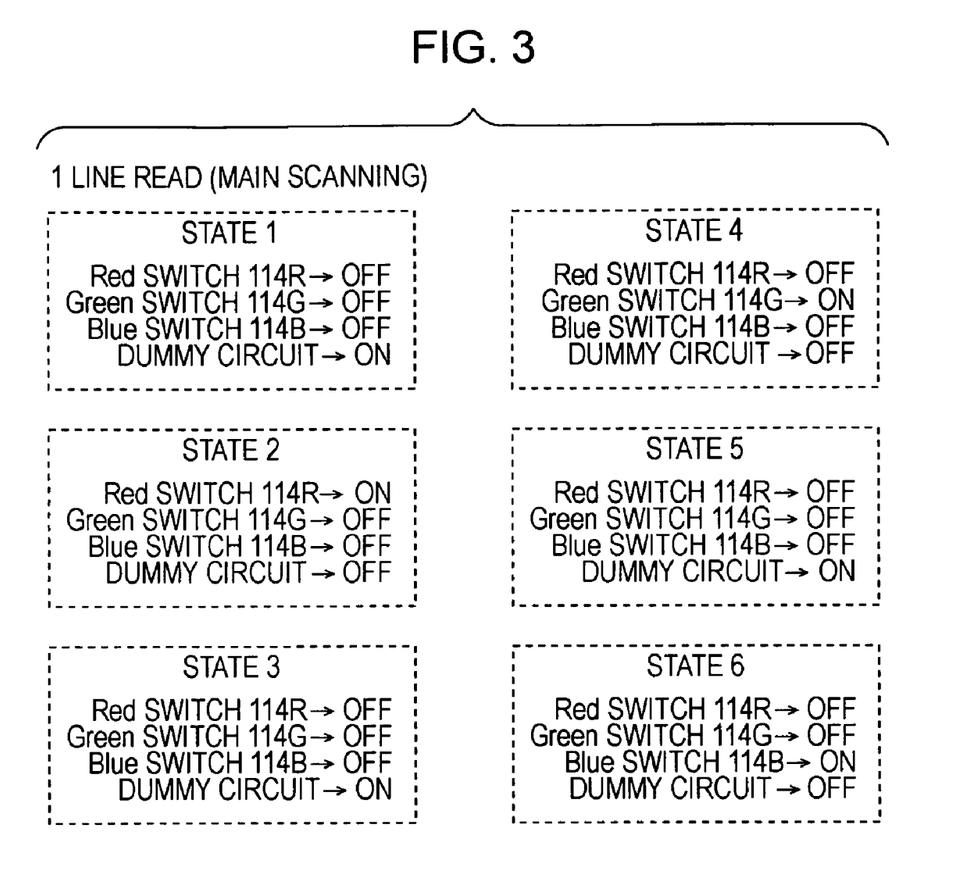
FIG. 3 is an explanatory view for explaining a control procedure of the LED driving portion when reading image data.

FIG. 3 is a view for explaining a control procedure of each of the switches 114R, 114G, and 114B and the switch of the dummy circuit 115 when the carriage 200 reads image data by one line. In addition, FIG. 4 is a timing chart illustrating the supply timing of a control signal for controlling each of the switches 114R, 114G, and 114B and the switch of the dummy circuit 115.

(STATE 1)

Figure 4:
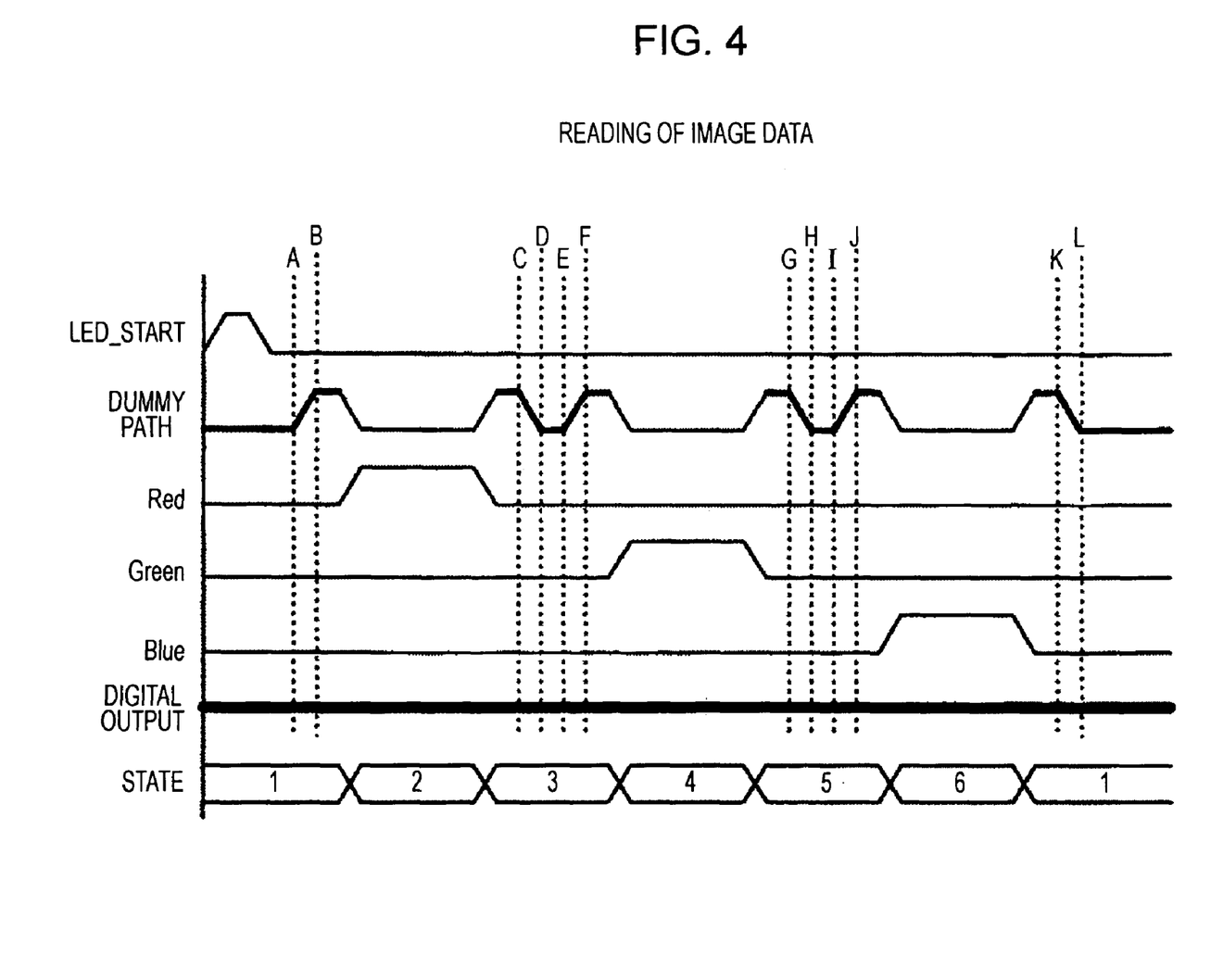
FIG. 4 is a timing chart illustrating the supply timing of a control signal for controlling the LED driving portion when reading image data.

As shown in FIG. 3, the switch control portion 118 turns on the switch of the dummy circuit 115 while maintaining all of the switch 114R only for red LED, the switch 114G only for green LED, and the switch 114B only for blue LED in the OFF state after a predetermined number of clocks are supplied in response to a read start instruction (LED_START ON) from the read control portion 120 (timing A and B of FIG. 4).

After the switch of the dummy circuit 115 is turned on, the current adjusting portion 117 makes an adjustment such that the value of the current supplied to the dummy circuit 115 becomes a predetermined value of a current to be supplied to the red LED 211R while acquiring a value of a current flowing from the galvanometer 116 to the dummy circuit 115.

(STATE 2)

After adjustment of the current value, the switch control portion 118 turns off the switch of the dummy circuit 115 and turns on the switch 114R only for red LED as shown in FIG. 3. Then, the current with the current value that was supplied to the dummy circuit 115 immediately before is supplied to the red LED 211R. As a result, the red LED 211R lights with predetermined brightness.
(STATE 3)

After making the red LED 211R light continuously for a predetermined time, the switch control portion 118 turns off the switch 114R only for red LED while turning on the switch of the dummy circuit 115 again. Then, the current with the current value that was supplied to the red LED 211R immediately before is supplied to the dummy circuit 115. Thereafter, the switch control portion 118 turns off the switch of the dummy circuit 115 to reset the value of the current supplied to the dummy circuit 115 (timing C and D of FIG. 4). Then, the switch control portion 118 turns on the switch of the dummy circuit 115 again (timing E and F of FIG. 4).

After the switch of the dummy circuit 115 is turned on, the current adjusting portion 117 makes an adjustment such that the value of the current supplied to the dummy circuit 115 becomes a predetermined value of a current to be supplied to the green LED 211G while acquiring a value of a current flowing from the galvanometer 116 to the dummy circuit 115.
(STATE 4)

After adjustment of the current value, the switch control portion 118 turns off the switch of the dummy circuit 115 and turns on the switch 114G only for green LED. Then, the current with the current value that was supplied to the dummy circuit 115 immediately before is supplied to the green LED 211G. As a result, the green LED 211G lights with predetermined brightness.
(STATE 5)

After making the green LED 211G light continuously for a predetermined time, the switch control portion 118 resets the value of the current supplied to the dummy circuit 115 (timing G and H of FIG. 4) and makes an adjustment such that the value of the current supplied to the dummy circuit 115 becomes a predetermined value of a current to be supplied to the blue LED 211B (timing I and J of FIG. 4), similar to the control in STATE 3.
(STATE 6)

After adjustment of the current value, the switch control portion 118 turns off the switch of the dummy circuit 115 and turns on the switch 114B only for blue LED. Then, the current with the current value that was supplied to the dummy circuit 115 immediately before is supplied to the blue LED 211B. As a result, the blue LED 211B lights with predetermined brightness.

After making the blue LED 211B light continuously for a predetermined time, the switch control portion 118 turns off the switch 114B only for blue LED while turning on the switch of the dummy circuit 115 again. Then, the switch control portion 118 turns off the switch of the dummy circuit 115 before reading of image data of one line ends (timing K and L of FIG. 4).

By the above-described control procedure, the LED control portion 112 controls ON and OFF of each of the LEDs 211R, 211B, and 211G when reading image data of one line.

In addition, here, the lighting time of each of the LEDs 211R, 211B, and 211G changes with a color. This is because the amount of output charges photoelectrically converted for each color does not become equal if the lighting time is set equal since there are difference and variation, which are caused by colors, in brightnesses of RGB (three colors) and sensitivities of sensors. Therefore, the lighting time is set differently according to the brightnesses of RGB (three colors) and the sensitivities of sensors.

Furthermore, it is known that a noise is added to the image data that the conversion portion 111 outputs to the digital data processing portion 130 at the above timing A to L. This is a noise caused by switching of the unit (red LED 211R, green LED 211G, blue LED 211B, and dummy circuit 115) to which a current is supplied.

Furthermore, also when reading black reference data, the LED control portion 112 supplies a current to the dummy circuit 115 by the same control as when the image data is read. Then, a noise equivalent to the noise added at the time of reading of image data is added to the black reference data read by the carriage 200.

Therefore, the dummy circuit 115 in this application is used to stabilize a current supplied to each of the LEDs 211R, 211G, and 211B or to reduce the adverse effect caused by the power fluctuation and is also used to add the above-described noise to the black reference data. For this reason, it is not necessary to provide a separate circuit (configuration) for every object.

Referring back to FIG. 1, the read control portion 120 controls the driving mechanism 300 to control the movement of the carriage 200. In addition, the read control portion 120 controls an image reading operation (read operation of black reference data and white reference data is also included) of the image sensor 220. Specifically, the read control portion 120 controls the timing of transfer of data, which was read by the image sensor 220, to the A/D conversion portion 110. In addition, the read control portion 120 controls an operation of the A/D conversion portion 110 (conversion portion 111 and LED control portion 112).

The digital data processing portion 130 performs various kinds of correction, such as shading correction, on digital data output from the conversion portion 111 of the A/D conversion portion 110 and outputs the corrected digital data to the output portion 150. For example, in case of performing shading correction, the digital data processing portion 130 stores image data, black reference data, and white reference data output from the conversion portion 111 in the storage portion 140, which will be described later, and performs shading correction according to following Expression 1 for every pixel. Expression 1 is an operation expression that makes the entire image data have uniform brightness on the average and includes an operation of calculating a difference between image data and black reference data. Here, as described above, the same noise as the noise added to the image data is added to the black reference data. Accordingly, the noise added to image data can be removed by calculating the difference between the image data and the black reference data at the time of shading correction. After the correction, the digital data processing portion 130 outputs corrected image data to the output portion 150.

$$Dout(n)=k\cdot\{Din(n)-K(n)\}/W(n) \qquad \text{(Expression 1)}$$

Here, it is assumed that 'k' is a coefficient, 'Din(n)' is image data of an n-th pixel, 'K(n)' is black reference data of the n-th pixel, 'W(n)' is white reference data of the n-th pixel, and 'Dout(n)' is corrected data of the n-th pixel.

The storage portion 140 stores data on which the digital data processing portion 130 performs various kinds of correction processing. Specifically, the storage portion 140 has an image data DB (database) 141 that stores image data before correction, a black reference data DB 142 that stores black reference data, and a white reference data DB 143 that stores white reference data.

The output portion 150 includes an interface for making network connection or USB connection and transmits the digital data output from the digital data processing portion 130 to a host computer.

The image reader 50 to which the present embodiment is applied has the above-described configuration. However, the configuration of the image reader 50 is not limited thereto. For example, the image reader 50 may be a complex machine further having a print function or a facsimile function.

In addition, the above-described constituent components are classified according to the main processing in order to make the configuration of the of the image reader 50 easily understood. The invention in this application is not limited by the classification method or names of the constituent components. The configuration of the image reader 50 may also be classified into a more number of constituent components according to processing. Moreover, the classification may also be performed such that one constituent component executes more processing. In addition, processing of each constituent component may be executed by single hardware or may be executed by a plurality of hardware.

Figure 5:
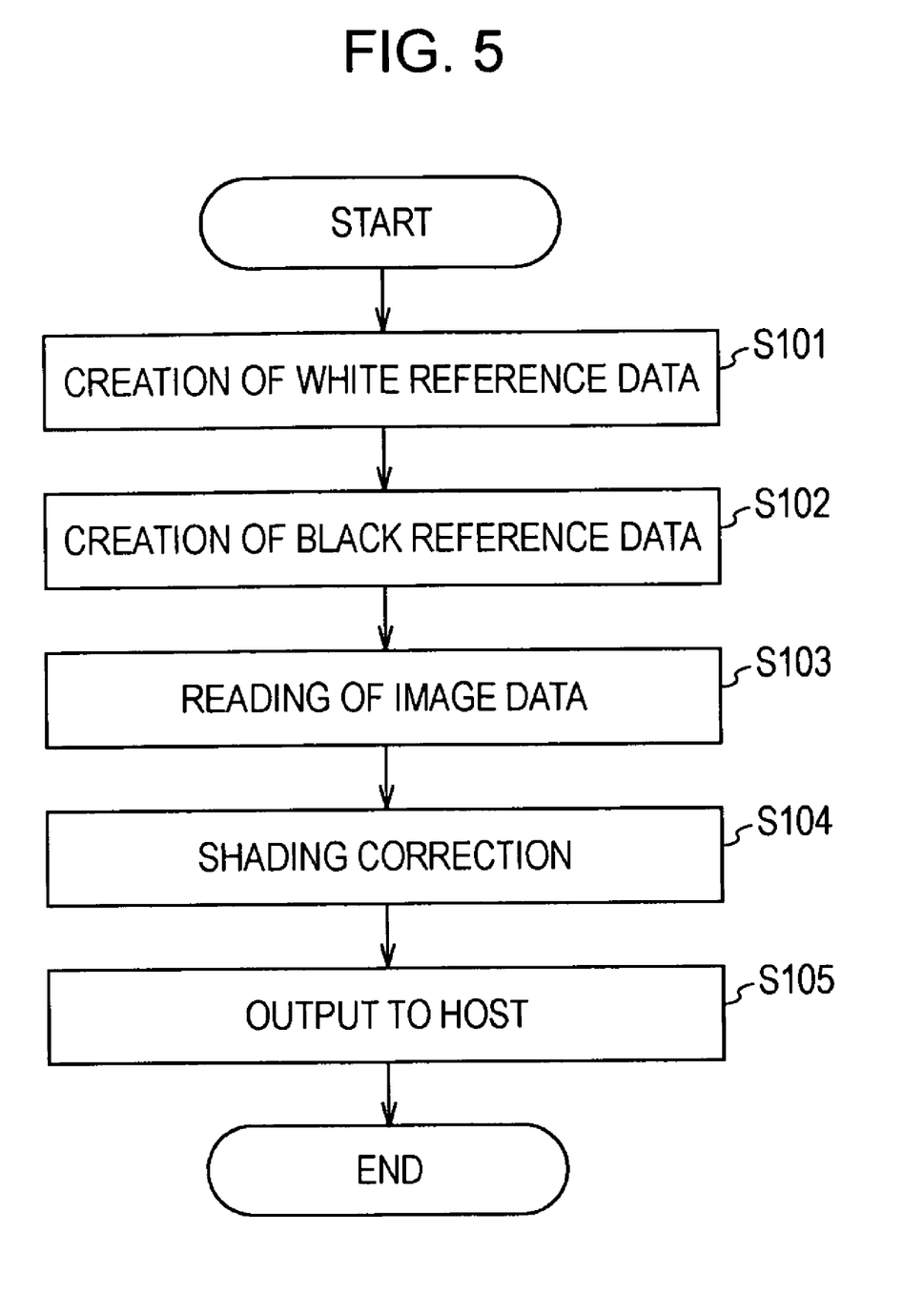
FIG. 5 is a flow chart for explaining image reading processing performed by the image reader.

Next, a characteristic operation of the image reader 50 having the above configuration will be described. FIG. 5 is a flow chart illustrating image reading processing performed by the image reader 50.

The control unit 100 of the image reader 50 starts the image reading processing when an instruction of start of the image reading processing is received from a user. Here, the user's instruction is received through an input device (not shown) provided in a host computer or the image reader 50.

The control unit 100 creates white reference data after the image reading processing starts (step S101). Specifically, first, the read control portion 120 supplies an instruction signal to the LED control portion 112 to turn on all LEDs of the LED light source 210. At this timing, the image sensor 220 receives light reflected from a reflecting plate for acquisition of white reference data according to a control signal from the read control portion 120. Then, the image sensor 220 accumulates electric charges corresponding to the amount of received light and transmits the electric charges to the conversion portion 111 as white reference data (analog data). At this time, the conversion portion 111 converts the received white reference data into digital data and transmits the digital data to the digital data processing portion 130. Then, the digital data processing portion 130 stores the transmitted white reference data (digital data) in the white reference data DB 143.

Then, the control unit 100 creates black reference data (step S102). Specifically, the read control portion 120 creates the black reference data by making the image sensor 220 read image data in a state where the LED light source 210 is turned off.

Figure 6:
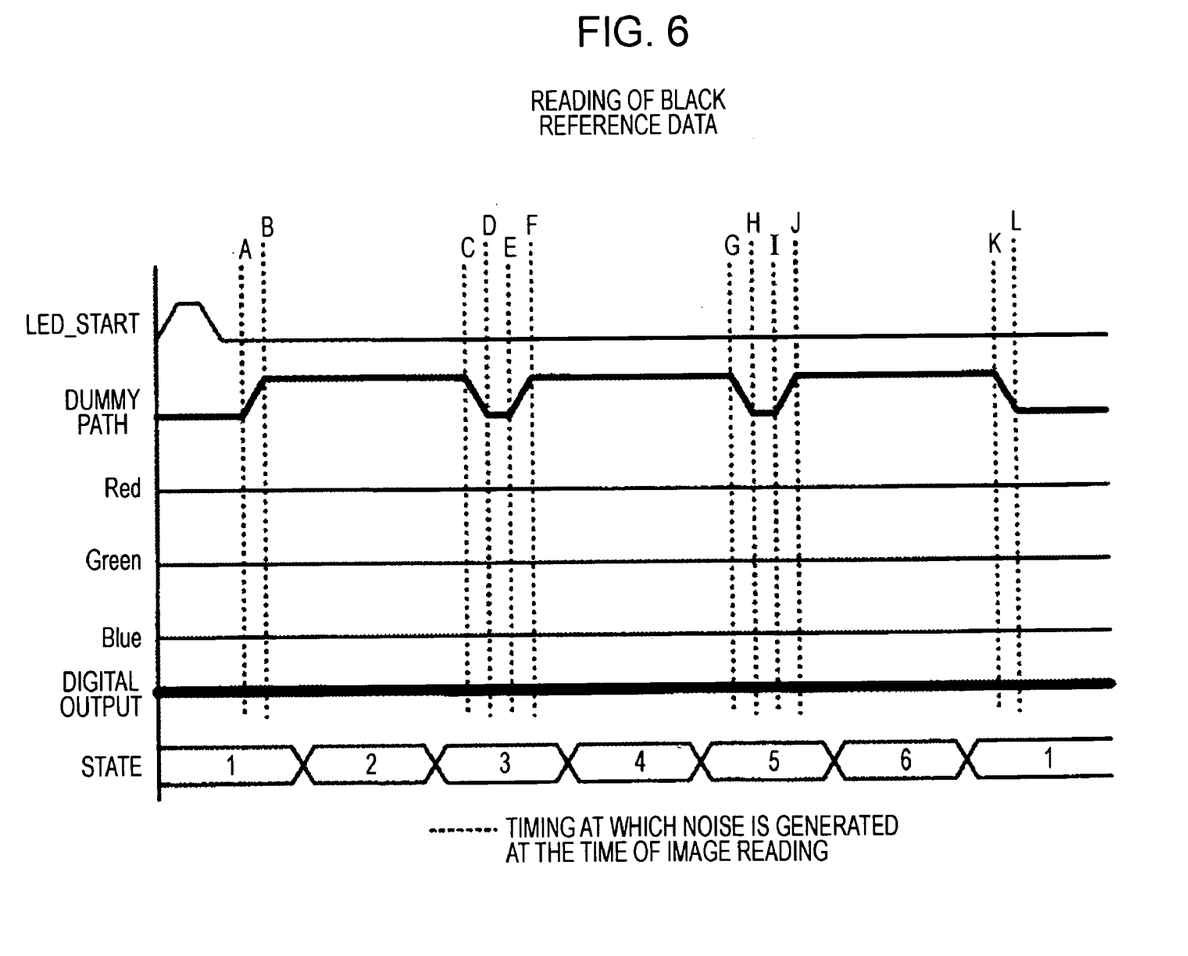
FIG. 6 is a timing chart illustrating the supply timing of a control signal for controlling the LED driving portion when creating black reference data.

For example, FIG. 6 is a timing chart illustrating the supply timing of a control signal for controlling each of the switches 114R, 114G, and 114B and the switch of the dummy circuit 115 when the control unit 100 creates black reference data.
(STATE 1)

Similar to the case of reading image data, the switch control portion 118 turns on the switch of the dummy circuit 115 while maintaining all of the switch 114R only for red LED, the switch 114G only for green LED, and the switch 114B only for blue LED of the LED driving portion 113 in the OFF state, as shown in FIG. 6, after a predetermined number of clocks are supplied in response to the read start instruction (LED_START ON) from the read control portion 120 (timing A and B matching that in the case of reading image data).
(STATE 2)

The switch control portion 118 supplies a current to the dummy circuit 115 for a predetermined time while maintaining all of the switch 114R only for red LED, the switch 114G only for green LED, and the switch 114B only for blue LED of the LED driving portion 113 in the OFF state.
(STATE 3)

Thereafter, the switch control portion 118 turns off the switch of the dummy circuit 115 at timing C and D matching that in the case of reading image data (timing C and D). Thereafter, the switch control portion 118 turns on the switch of the dummy circuit 115 again at timing E and F matching that in the case of reading the image data (timing E and F).
(STATE 4)

Then, the switch control portion 118 supplies a current to the dummy circuit 115 for a predetermined time while maintaining all of the switch 114R only for red LED, the switch 114G only for green LED, and the switch 114B only for blue LED of the LED driving portion 113 in the OFF state.
(STATES 5 and 6)

The switch control portion 118 performs the same control as STATE 3 and STATE 4 after the supply.

While the above-described switch control (STATES 1 to 6) is being performed, the image sensor 220 accumulates electric charges corresponding to the amount of received light and continuously supplies the electric charges to the conversion portion 111 as black reference data (analog data). At this time, the conversion portion 111 converts the received black reference data into digital data and transmits the digital data to the digital data processing portion 130. In addition, the digital data processing portion 130 stores the transmitted black reference data (digital data) in the black reference data DB 142.

Then, the same noise as a noise added to image data at the time of image data reading in step S103, which will be described later, is added beforehand to the black reference data created in step S102.

Then, the control unit 100 reads image data of a document placed on the document stand (step S103). Specifically, the read control portion 120 controls the LED light source 210 and the LED driving portion 113 according to the procedure shown in FIGS. 3 and 4 so that the image sensor 220 reads image data. The image sensor 220 accumulates electric charges corresponding to the amount of received light and supplies the electric charges to the conversion portion 111 as image data (analog data). At this time, the conversion portion 111 converts the received image data into digital data and transmits the image data to the digital data processing portion 130. Then, the digital data processing portion 130 stores the transmitted image data (digital data) in the image data DB 141.

Figure 7:
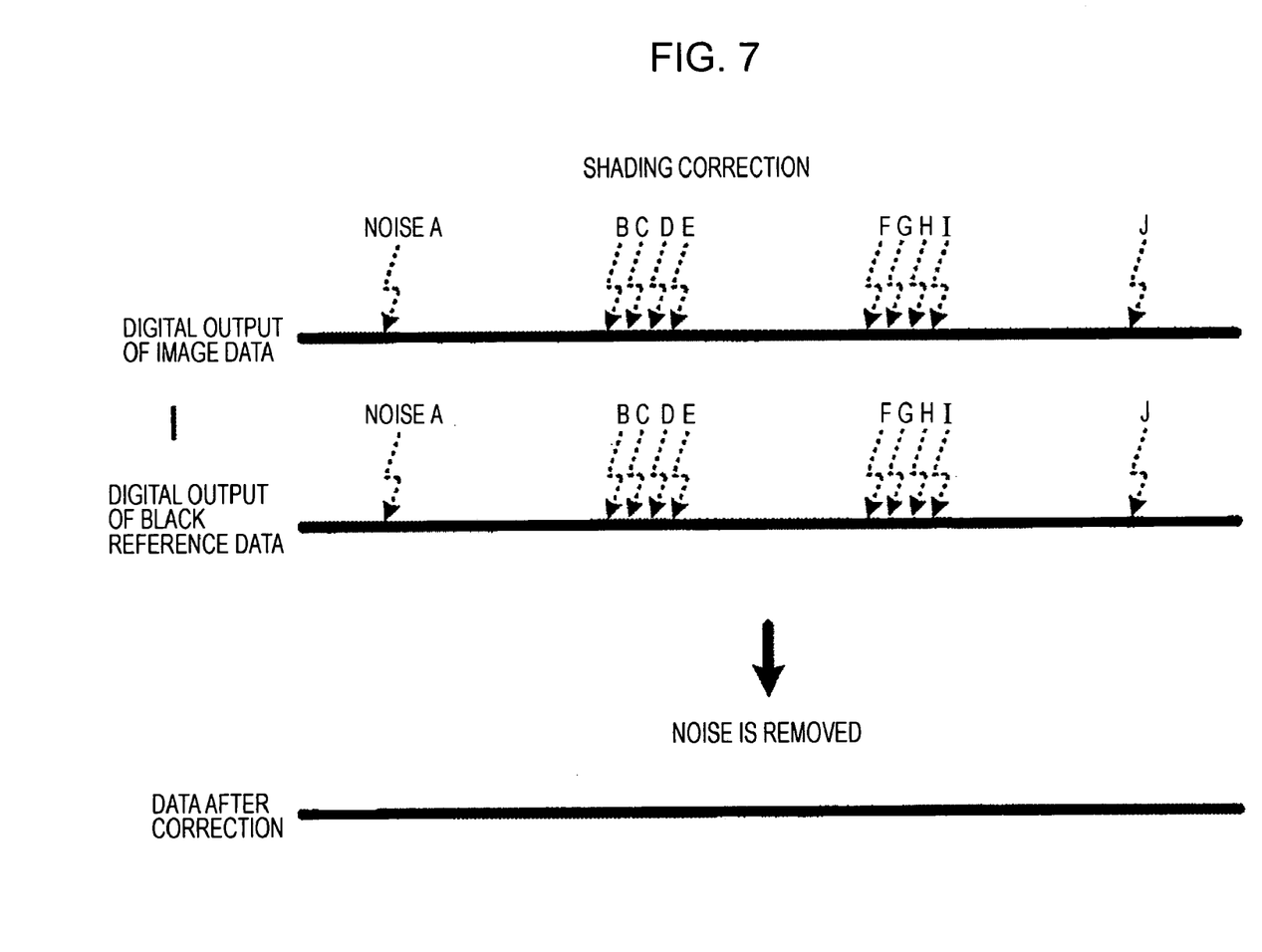
FIG. 7 is an explanatory view for explaining the concept of removing a noise of image data in shading correction.

Here, FIG. 7 is an image view illustrating the black reference data created in step S102 and the image data read in step S103. As shown in FIG. 7, in the black reference data and the image data, the same noises are added at corresponding positions (for example, corresponding pixels).

Referring back to FIG. 5, the control unit 100 performs shading correction on the image data read in step S103 (step S104). Specifically, the digital data processing portion 130 performs shading correction on the image data stored in the image data DB 141 using the operation expression shown in Expression 1. For example, the digital data processing portion 130 reads an n-th pixel of image data stored in the image data DB 141, an n-th pixel of black reference data stored in the black reference data DB 142 and an n-th pixel of white reference data stored in the white reference data DB 143 into an operation memory and executes an operation of Expression 1. Then, the operation of Expression 1 is executed for each of all pixels included in the image data. In this case, an operation of calculating the difference between the image data and the black reference data is included in the operation of Expression 1. Accordingly, the noise added to the image data is removed by the operation of Expression 1 as shown in FIG. 7.

Subsequently, the control unit 100 outputs image data after performing various kinds of correction including the shading correction to the host computer (step S105).

The control unit 100 ends the image reading processing after output of the image data. At this time, the host computer that has received the image data performs processing for displaying the image data output from the image reader 50 on a display (not shown) connected to the host computer.

Since the above-described image reading processing is performed by the image reader 50, the noise which is added to image data by switching of supply of a current to the light source (red LED 211R, green LED 211G, and blue LED 211B) or the dummy circuit 115 can be reduced.

In addition, the invention is not limited to the above-described embodiment, but various changes and applications may be made.

For example, in the above-described embodiment, the operation expression shown in Expression 1 is used for the shading correction. However, the invention is not limited thereto as long as an operation of calculating the difference between image data and black reference data is included in the operation of performing the shading correction. Moreover, correction other than the shading correction may also be performed as long as the operation of calculating the difference between image data and black reference data is performed.

Furthermore, in the above-described embodiment, the LED light source 210 includes the red LED 211R, the green LED 211G, and the blue LED 211B to generate light components of three colors of RGB. However, the invention is not limited thereto. For example, a white LED may be used as the LED light source 210.

In addition, the invention is not limited to the CIS type image reader. The invention may also be applied to an optical reduction type (so-called CCD type) image reader.

What is claimed is:

1. An image, comprising:
   at least one light source;
   a light source control portion that controls a light source driving portion, the light source driving portion including a dummy circuit for adjusting an amount of current supplied to the light source;
   an image reading portion that reads image data from an image sensor captured while the light source control portion switches current to the light source according to a first timing and switches current to the dummy circuit according to a second timing;
   a black reference data reading portion that reads black reference data from the image sensor captured while the light source control portion switches current to the dummy circuit according to a third timing without switching current to the light source, the third timing corresponding to a timing at which noise is generated when the image data is captured;
   and
   a shading correction portion that performs shading correction of the image data using the black reference data, wherein the black reference data includes noise generated by switching current to the dummy circuit according to the third timing, which is equivalent to a noise added to the image data, and
   the shading correction portion removes the noise added to the image data by performing the shading correction.

2. The image reader according to claim 1, wherein the shading correction includes an operation of calculating a difference between the image data and the black reference data for every pixel.

3. The image reader according to claim 1, wherein the light source includes a red LED, a green LED, and a blue LED, and the light source control portion adjusts the amount of current supplied to each LED by supplying current to the dummy circuit before supplying current to each LED.

4. The image reader according to claim 1, wherein the light source control portion, the black reference data reading portion, and the image reading portion are disposed in the same circuit module that forms an analog front end.

5. A control circuit of an image reader having at least one light source, comprising:
   a light source control portion that controls a light source driving portion, the light source driving portion including a dummy circuit for adjusting an amount of current supplied to the light source;
   an image reading portion that reads image data from an image sensor captured while the light source control portion switches current to the light source according to a first timing and switches current to the dummy circuit according to a second timing;
   a black reference data reading portion that reads black reference data from the image sensor captured while the light source control portion switches current to the dummy circuit according to a third timing without switching current to the light source, the third timing corresponding to a timing at which noise is generated when the image data is captured;
   a noise removing portion that removes noise added to the image data using noise added to the black reference data by switching current to the dummy circuit according to the third timing; and
   a shading correction portion that performs shading correction of the image data using the black reference data.

6. A control method of an image reader having at least one light source and a light source control portion that controls a light source driving portion, the light source driving portion including a dummy circuit for adjusting an amount of current supplied to the light source, the control method comprising:
   capturing image data while the light source control portion switches current to the light source according to a first timing and switches current to the dummy circuit according to a second timing;
   capturing black reference data while the light source control portion switches current to the dummy circuit according to a third timing without switching current to the light source, the third timing corresponding to a timing at which noise is generated when the image data is captured;
   and
   performing shading correction of the image data using the black reference data,
   wherein the black reference data includes noise generated by switching current to the dummy circuit according to the third timing, which is equivalent to a noise added to the image data, and
   in the performing of the shading correction, the noise added to the image data is removed by performing the shading correction.

* * * * *